Nov. 15, 1927. 1,649,684

F. G. GROFF

TIME LIMIT STOP

Filed June 8, 1927   3 Sheets-Sheet 1

Inventor
Francis G. Groff
Adam E. Fisher
By Attorney

Nov. 15, 1927.

F. G. GROFF 1,649,684

TIME LIMIT STOP

Filed June 8, 1927

Inventor
Francis G. Groff
By Adam E. Fisher
Attorney

Nov. 15, 1927.  1,649,684

F. G. GROFF
TIME LIMIT STOP
Filed June 8, 1927   3 Sheets-Sheet 3

Inventor
Francis G. Groff
By Adam E. Fisher
Attorney

Patented Nov. 15, 1927.

1,649,684

UNITED STATES PATENT OFFICE.

FRANCIS G. GROFF, OF CLYDE, KANSAS.

TIME-LIMIT STOP.

Application filed June 8, 1927. Serial No. 197,372.

My invention relates to time limit stops in connection with automobile traffic signals, and has for one object to provide a means for controlling the periodic oscillation of a shaft within a definite time limit, the said means being more particularly useful in non-return motions adapted to be released after the expiration of a definite time limit.

Another object of my invention is to provide such a stop in connection with an automobile traffic signal, whereby such a signal may be set to the indication desired, and the said signal released from said indication after the expiration of a certain duration of time, thus preparing the said signal for another indication without further attention from the driver of the automobile.

With the above and other objects in view, my invention consists in the combination and arrangement of parts hereinafter described and claimed, of which one embodiment is shown in the accompanying drawing, wherein like characters of reference refer to like parts of the invention wherever they occur.

In the drawings

Figure 5:
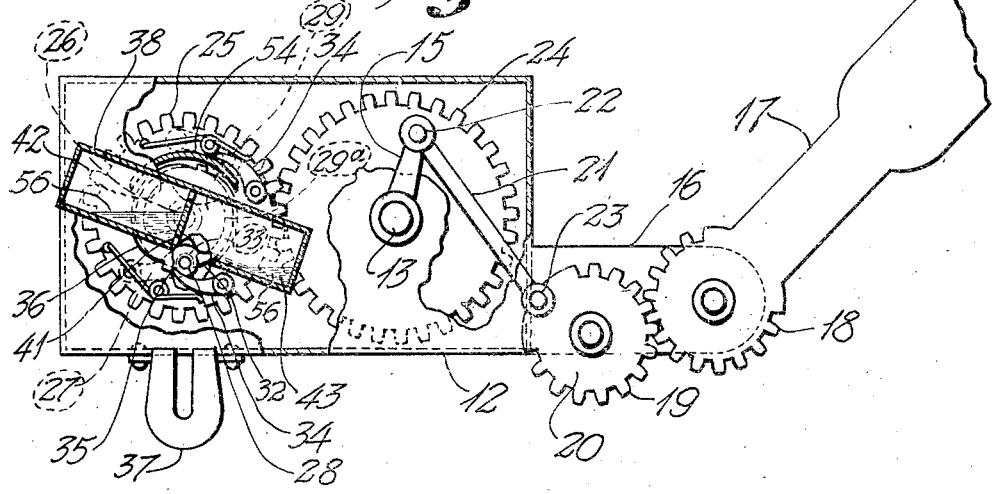
Figure 5 is a partly sectional view of my invention locked in its right turn indication.
Figure 6:
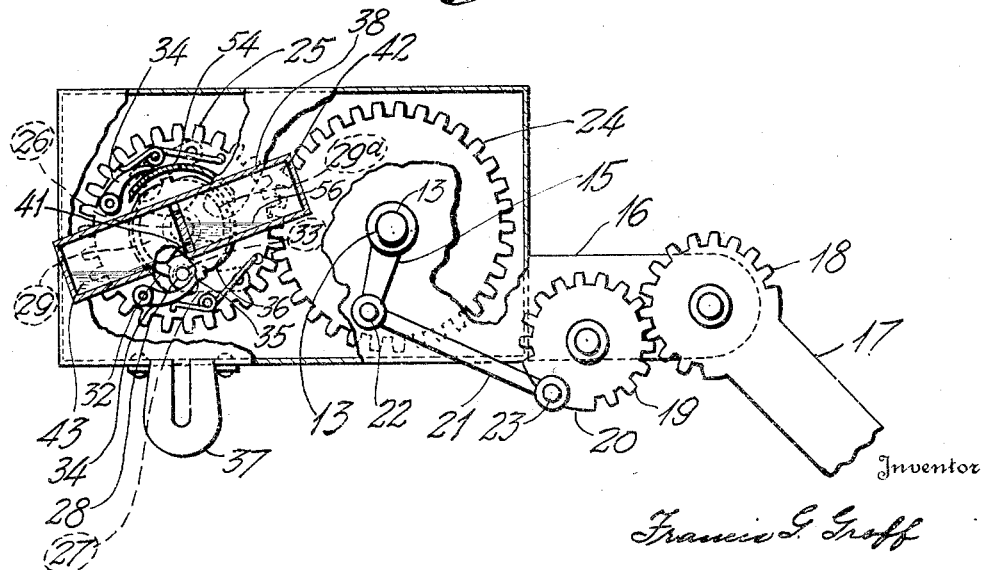
Figure 6 is a partly sectional view of my invention locked in its left turn indication.

Referring now more particularly to the drawings, the body of an automobile is indicated generally by 10, and in the embodiment of my invention shown the invention is installed at the forward and left hand corner of a closed body, such as a sedan or coupé, but it is obvious that my invention may also be used on other types of bodies of automobiles if desired. The invention comprises a housing 12 positioned exteriorly the said body 10; an operating shaft 13 is journaled in the said housing and adapted to extend rearwardly through the said body as at 14; a crank 15 is mounted on the forward extension 11 of the shaft; an extension arm of the housing 12 is provided as at 16; a semaphore 17 is journaled in the said arm 16; gear teeth as at 18 are provided in the said semaphore and adapted to engage gear teeth as at 19 provided on a bell crank 20 journaled in the said arm 16; a connecting rod 21 is pivoted to the said bell crank 20 as by a pin 23 and the said crank 15 as by a crank pin 22. An important feature of my invention lies in the angular relationship between the said crank 15 and the bell crank 20; referring now to Figure 1, the said relationship is such that when the semaphore 17 is in its non-indicating position, the prolongation of the center line of the said connecting rod 21 will lie to one side of the center of oscillation of the shaft 13; whereby a movement of the said crank pin 22 in a counter clockwise direction will result in a counter clockwise movement of the pin 23 greater than would result from a movement of equal magnitude of the pin 22 in a clockwise direction; in other words a movement of 90 degrees of the said shaft 13 in a counter clockwise direction will result in the embodiment illustrated in a movement of 135 degrees of the semaphore 17 as indicated in Figure 5; conversely, a movement of 90 degrees of the said shaft 13 in a counter-clockwise direction will result in a movement in the same direction as before but of only 45 degrees of the semaphore, as indicated in Figure 6.

Figure 1:
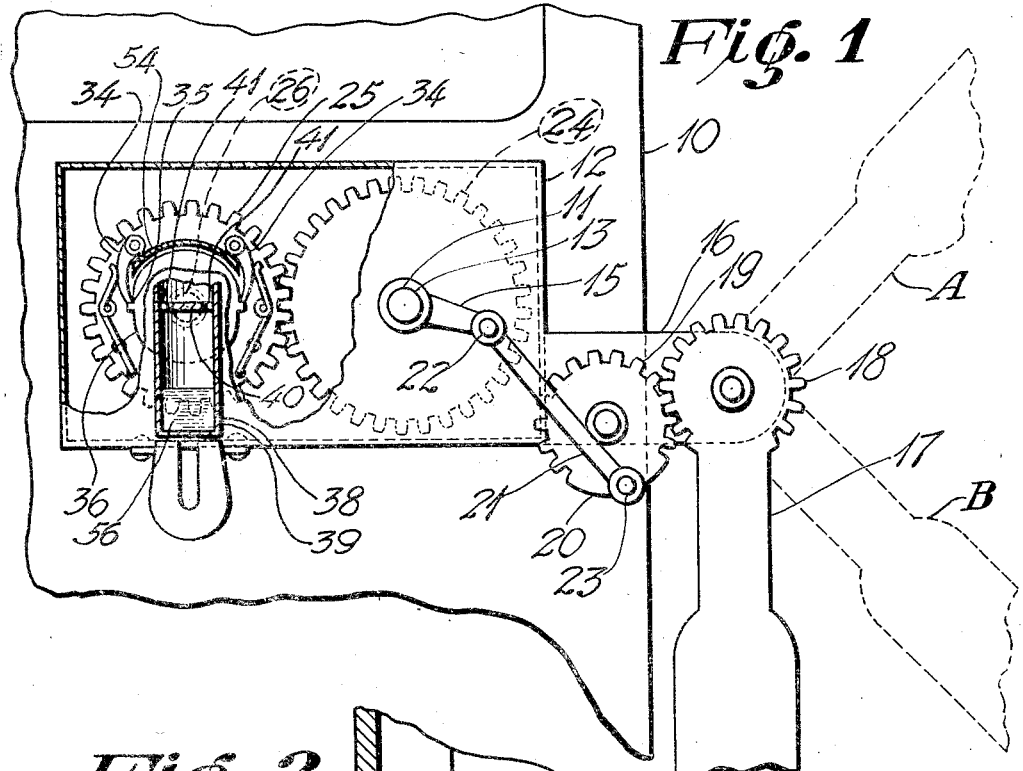
Figure 1 is a front elevation of my invention as applied to an automobile, parts thereof being shown in section.

From the foregoing description it will appear that, by oscillating the shaft 13 first in one direction and then in the other, the semaphore 17 will be caused to indicate a right-hand turn, as illustrated by "A" in Figure 1, or a left-hand turn, as illustrated by "B" in Figure 1; however, the semaphore would not remain in the indication desired unless held by the operator, or unless some means is provided to lock the shaft 13 so as to prevent the oscillation of the shaft that would result from the weight of the semaphore acting to return the semaphore and the shaft to the neutral or non-indicating position. At the same time, such a lock should not act to permanently lock the said shaft 13 in position, but should permit the said shaft to be returned to its non-indicating position by the weight of the semaphore in order that the signal may be prepared to give other indications as the need may arise. I provide such a means in connection with my invention, whereby the shaft is locked in position for a predetermined period of time, and then released for movement, so that the weight of the semaphore will return the device to its neutral or non-indicating position without further attention from the driver of the automobile; thus my invention requires the attention from the driver only once, namely when setting the signal—the releasing of the signal from the indication to which it is set, and the returning of the signal to the non-indicating position is accomplished automatically.

Figure 4:
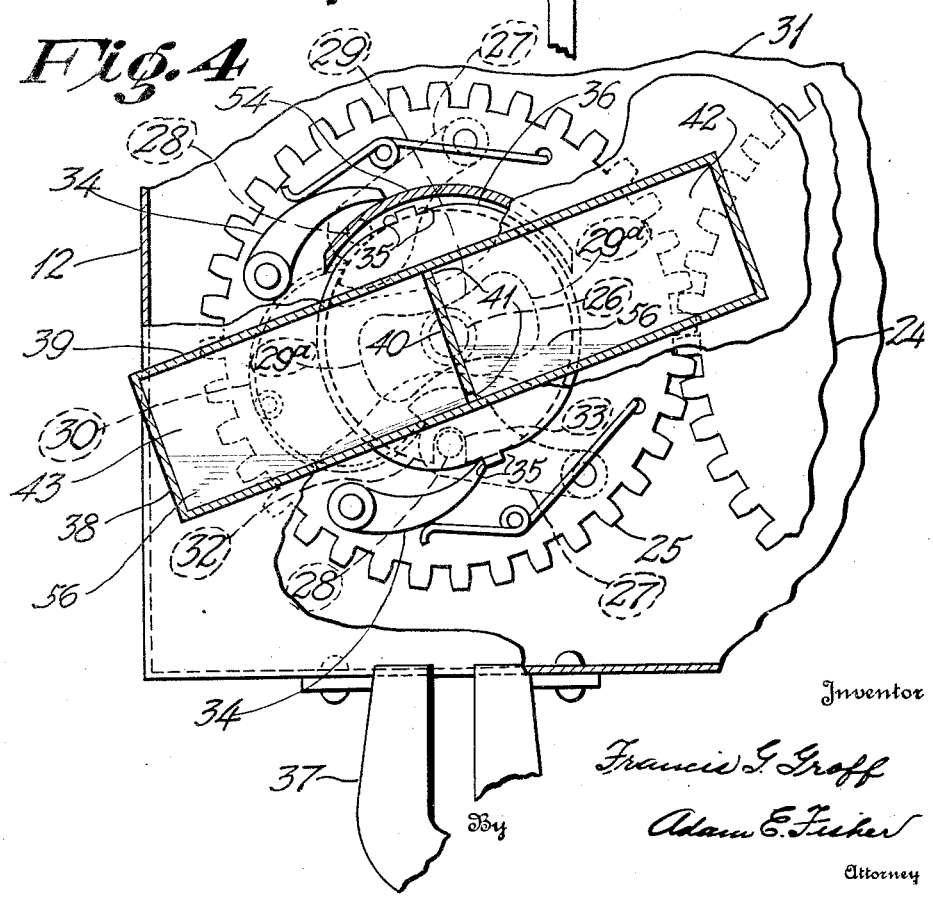
Figure 4 is a fragmentary view of a portion of Figure 6 showing the time limit stop.

In order to accomplish the foregoing object I provide a time limit stop comprising a gear 24 mounted on the shaft 13 within the housing 12, the said gear engaging the locking gear 25 rotatably mounted on the locking shaft 26 journaled in the housing 12. A dog 27 provided with a projecting pin 28 is pivotably mounted on the rear side of the gear 25 and on each side of the shaft 26, there being two such dogs provided, one facing clockwise and one facing counterclockwise, so as to embrace between them the double cam 29 mounted on the shaft 26 and adapted to rotate therewith. The said cam 29 is made in the shape of a figure 8, such that the lobes of the 8 as at 29ª are adapted to push the said dog 27 outwardly from the shaft 26 when the said shaft is caused to rotate in a manner hereinafter described. A spring 30 is provided and adapted to urge the said dogs 27 inwardly against the said cam 29. Positioned on the rear cover 31 of the housing 12 is a locking cam 32; the said locking cam is circular, but has provided therein a notch 33 positioned in the periphery of the said locking cam exactly vertically below the said shaft 26. The pins 28 of the dogs 27 are adapted to slidably engage the periphery of the said locking cam 32 and to engage the said notch 33 when properly positioned to do so as shown in Figure 4. Two spring set latches 34 are pivotably mounted on the front side of the locking gear 25 and on either side of the said shaft 26; the latches point in opposite directions, and are adapted to engage oppositely positioned notches 35 provided in the periphery of the collar 36 mounted on the shaft 26 and adapted to rotate therewith. The gear 25 is positioned between the collar 36 and the locking cam 32; the gear 25 will rotate freely between the said collar and the said locking cam unless prevented from doing so by the engagement of one of the pins 28 with the notch 33 of the locking cam 32 whereupon rotation of the said gear 25 is altogether prevented; or by the engagement of one of the latches 34 with one of the notches 35 of the collar 36 whereupon rotation of the gear 25 will also cause the rotation of the shaft 26. The said shaft 26 is adapted to extend forwardly through the housing 12 and has positioned thereon the timing element 38; the said timing element in the embodiment shown, comprises a cylinder 39 provided with a medial partition 40; oppositely positioned apertures 41 are provided in the said partition 40, the axis of the apertures being transversely the axis of rotation of the timing element; the size of the said apertures is optional with the person constructing the device, or they may be made adjustable by any convenient means and not here shown. A heavy fluid 56, such as mercury, is placed in the said cylinder 39, and adapted to flow from the one upper compartment, as at 42, of the cylinder 39 to the other lower compartment, as at 43; the length of time required for the flow of the liquid from one compartment to the other will determine the time limit of the device, as will hereinafter be described. A permanent magnet 37 is positioned vertically beneath the cylinder 39 so as to dampen any oscillations of the cylinder due to swaying of the automobile.

A dial plate, as at 44, is provided on the rear side of the housing 12, and a crank 45 and handle 49 are mounted on that portion of the shaft 13 extending through the housing 12 as at 14. Stops 47 are provided on either side of the shaft 13 so as to limit the throw of the crank 45 to 90 degrees on either side of the vertical center of the shaft. A pin 46 as a part of the handle 49 is positioned on the crank 45; a flexible element 50 is fastened to the said pin and adapted to extend in both directions horizontally therefrom; guide pulleys 51 are provided adapted to have the said flexible element 50 passed thereover; the said flexible element terminates at both ends in springs 53, having their ends fastened to the said dial 44. Stops 55 are positioned on the said flexible element 50 suitably to limit the movement of the said flexible element over the guides 51, so that normally the action of the springs 53 will be to cause the said crank 45 to take an upright position medially the dial 44, in which position the mechanism heretofore described is adapted to bring the signal or semaphore 17 to its non-indicating position as shown in Figure 1; the action of the springs 53 will assist the action of gravity as heretofore described, in returning the semaphore 17 to its non-indicating position.

In the use of my invention, the signal being in its non-indicating position as heretofore described, the timing element 38 is positioned on the shaft 26 so as to have its axis extending vertically, whereby the cam 29 is caused to have the lobes 29ª extending vertically and the dogs 27 are adapted to be disengaged from the said cam 29 with the pins 28 slidably engaging the periphery of the locking cam 32; in this position the pins 28 are positioned oppositely from the said notch 33 and spaced about 20 degrees from a horizontal line drawn through the center of the shaft 26. In this position, also, the notches 35 of the collar 36 are adapted to be positioned in a horizontal line drawn through the said shaft 26. The latches 34 are so positioned on the gear 25 as to be wholly positioned to one side of the horizontal center line of the shaft 26 and also on the side of the gear 25 opposite from the notch 33; the latches point towards the notches 35 aforesaid, and engaging therewith. An arcuate track 54 is provided concentrically the collar 36, and extending around a portion of the perpihery of the said collar 36 such that the said latches 34 will be adapted to slidably engage the said track 54 when the gear 25 is rotated but will disengage the track 54 when in the non-indicating position as shown in Figure 1.

Figure 2:
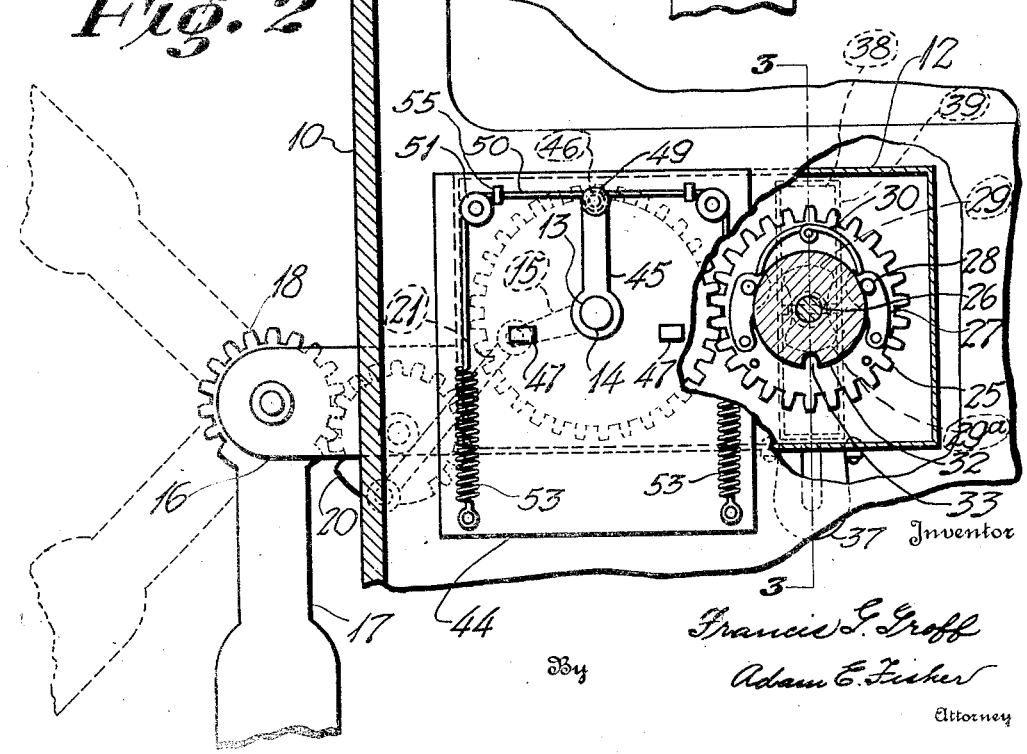
Figure 2 is an elevation of my invention as seen from the interior of the automobile, showing the method of operating the signal.
Figure 3:
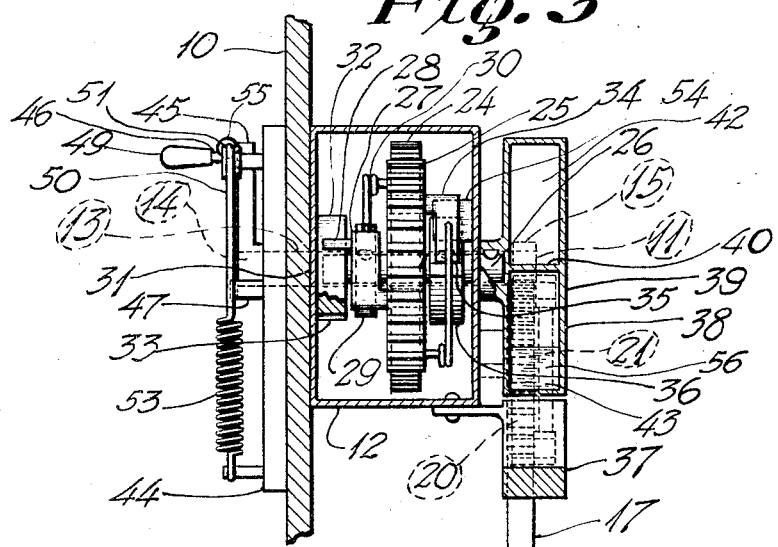
Figure 3 is a sectional view of my invention along the line 3—3 in Figure 2.

Referring to Figure 2, when it is described to indicate a left turn the crank 45 is turned to the left (clockwise in Figure 6) until prevented from further movement by the stop 47; at the same time the pointer carries the flexible element 50 laterally so as to extend the right hand spring 53; the left hand spring 53 is prevented from further contraction by the stop 55 engaging the guide 51. Referring now to Figure 6, the movement of the pointer will cause the shaft 13 to turn clockwise through an angle of 90 degrees, whereby the gear 24 will cause the counter clockwise rotation of the locking gear 25, thereby causing the left hand latch 34 in Figure 1 to engage the left hand notch 35, so as to rotate the collar 36 and shaft 26 approximately 110 degrees as in Figure 6. At the same time the rotation of the gear 25 will cause the dogs 27 to rotate about the cam 32, so that the pin 28 of the one dog 27 will engage the notch 33, when further movement in either direction will be prevented, and the other dog 27 will ride on the track 54. In the meantime the rotation of the collar 36 with the gear 25 and the shaft 26 therewith, will cause the timing element 38 to rotate 110 degrees counter clockwise to a position where the axis of the said timing element will be 20 degrees off the horizontal, with the loaded compartment, as at 42, higher than the empty compartment 43, whereby the mercury contained in the timing element will flow through one of the apertures 41 from the compartment 42 to the compartment 43 as shown in Figure 6. The action of the one latch 34 engaging the notch 35 prevents the reverse or clockwise movement of the shaft 26, but permits the further movement of the shaft 26 in a continuation of the counter clockwise direction described; hence, when the mercury has been transferred to the lower compartment, the weight of the fluid will cause the timing element to cause the further counter clockwise rotation of the shaft 26 until the axis of the timing element is again in a vertical position; (the other latch 34 will ride on the track 54 and thus be prevented from engaging the collar 36); this further movement causes the cam 29 to engage the dog 27 so as to push the dog outwardly, thereby releasing the pin 28 from engagement with the notch 33, whereupon the mechanism is free to return to the non-indicating position. At the same time the timing element 38, by reason of the weight of the mercury, aided by the magnet 37, will be adapted to remain in its vertical position, and thus prepared for another setting of the signal.

When it is desired to indicate a right turn the reverse of the movements above described will take place, as shown in Figure 5.

I claim:

1. In a traffic signal a rotatable semaphore adapted to give two different traffic indications by rotating said semaphore in the same direction from its non-indicating position; an oscillating crank adapted to oscillate equally on either side of its non-indicating position; and means for communicating the motion of said crank to said semaphore, the said means comprising a rotatable crank geared to the semaphore; and a connecting rod pivoted to said oscillating crank and said pivoted crank, the center line of said connecting rod normally obliquely crossing a line connecting the center of oscillation of said oscillating crank and the center of rotation of the crank geared to the semaphore.

2. In a traffic signal the combination with a rotatable semaphore adapted to give two different traffic indications by rotating said semaphore in the same direction from its non-indicating position and an oscillating crank adapted to oscillate equally on either side of its non-indicating position, of a means for communicating the motion of said crank to said semaphore; the said means comprising a rotatable crank geared to the semaphore; and a connecting rod pivoted to said oscillating crank and said pivoted crank, the center line of said connecting rod normally obliquely crossing a line connecting the center of oscillation of said oscillating crank and the center of rotation of the crank geared to the semaphore.

3. In a traffic signal the combination with a housing, a semaphore and an operating shaft journaled in the housing adapted to move said semaphore from its non-indicating position to a traffic indication, of a time limit stop adapted to control the return of said semaphore to said non-indicating position, the said time limit stop comprising an operating gear adapted to rotate with the said operating shaft; a locking shaft journaled in said housing, a locking gear adapted to engage said operating gear and journaled on said locking shaft; a timing element mounted on said locking shaft; locking means mounted on said locking gear and said housing and means for causing said timing element to release said locking means whereby said locking gear may be released for rotation by said operating shaft.

4. In a device of the kind described in claim 3, including a housing, a locking shaft journaled in said housing, a locking gear journaled on said shaft and a timing element mounted on said shaft; a fixed circular locking cam on said housing and having a notch in its periphery; dogs pivoted to said gear adapted to engage said notch; a releasing cam mounted on said shaft adapted to release said dogs from said notch; a collar mounted on said shaft, said collar having diametrically positioned timing notches in its periphery; latches pivotably mounted on said gear adapted to engage said timing notches; and a timing element mounted on said shaft and adapted to rotate said releasing cam and said collar.

5. In a device of the kind described in claim 3, a magnet mounted on said housing vertically below said timing element for the purpose of urging said timing element to remain in its normal position, as described.

In testimony whereof I affix my signature.

FRANCIS G. GROFF.